United States Patent [19]
Horikawa et al.

[11] Patent Number: 5,966,513
[45] Date of Patent: Oct. 12, 1999

[54] ATM NETWORK TOPOLOGY MANAGEMENT METHOD

[75] Inventors: Koichi Horikawa; Hiroshi Suzuki, both of Tokyo, Japan

[73] Assignee: NEC Corporation, Tokyo, Japan

[21] Appl. No.: 08/734,020

[22] Filed: Oct. 18, 1996

[30] Foreign Application Priority Data

Oct. 18, 1995 [JP] Japan .................................. 7-269805

[51] Int. Cl.⁶ .................................................. G06F 13/00
[52] U.S. Cl. .................... 395/200.53; 370/401; 370/402; 370/403; 370/407; 370/408; 370/395; 370/254; 395/200.54
[58] Field of Search .................................. 370/254, 401, 370/402, 403, 407, 408, 395; 395/200.53, 200.54

[56] References Cited

U.S. PATENT DOCUMENTS 5,617,540  4/1997  Civanlar et al. ................... 395/200.57
5,664,107  9/1997  Chatwani et al. .................. 395/200.54
5,732,078  3/1998  Arango .................................. 370/355

FOREIGN PATENT DOCUMENTS 8-32597  2/1996  Japan .

*Primary Examiner*—Dung C. Dinh
*Assistant Examiner*—William Titcomb
*Attorney, Agent, or Firm*—Sughrue, Mion, Zinn, Macpeak & Seas, PLLC

[57] ABSTRACT

An ATM network topology management method for an ATM network using an NBMA Next Hop Resolution Protocol (NHRP) to obtain an ATM address from a network address in the ATM network, when a network management system (NMS) is directly connected to the ATM network, including the following steps: (1) reading a network address of an NHRP server that has been set in an NHRP client placed in the NMS; (2) recognizing a topology of a logical subnet served by the NHRP server within the ATM network by accessing the NHRP server with a network address derived from step (1) and obtaining information on a logical subnet served by the NHRP server, an ATM terminal and an ATM switch belonging to the logical subnet; and (3) the NMS reading information on another NHRP server within the ATM network from the NHRP server, obtains a network address of the other NHRP server, accesses the other NHRP server with an obtained network address and obtains information on other logical subnet served by the other NHRP server and an ATM terminal and an ATM switch belonging to the other logical subnet so that a topology of a logical subnet served by the other NHRP server is automatically recognized in the ATM network.

27 Claims, 3 Drawing Sheets

Fig.3A

EXAMPLE OF nhrpAddrTable
nhrpAddrTable OF NHS-A

| IP ADDRES | ATM ADDRES |
|---|---|
| IP - T1 | ATM - T1 |
| IP - T2 | ATM - T2 |
| IP - S1 | ATM - S1 |
| IP - S2 | ATM - S2 |
| IP - S3 | ATM - S3 |
| IP - R1 | ATM - R1 |
| IP - NMS-1 | ATM - NMS - 1 |

Fig.3B

EXAMPLE OF nhrpAddrTable
nhrpAddrTable OF NHS-B

| IP ADDRES | ATM ADDRES |
|---|---|
| IP - T3 | ATM - T3 |
| IP - T4 | ATM - T4 |
| IP - T5 | ATM - T5 |
| IP - S4 | ATM - S4 |
| IP - S5 | ATM - S5 |
| IP - S6 | ATM - S6 |
| IP - S7 | ATM - S7 |
| IP - S8 | ATM - S8 |
| IP - R2 | ATM - R2 |

Fig.4A

EXAMPLE OF nhrpServerTable
nhrpServerTable OF NHS-A

| NHS ADDRES | LIS |
|---|---|
| IP - NHS - A | LIS - A |
| IP - NHS - B/C | LIS - B |
| IP - NHS - B/C | LIS - C |

Fig.4B

EXAMPLE OF nhrpServerTable
nhrpServerTable OF NHS-B/C

| NHS ADDRES | LIS |
|---|---|
| IP - NHS - B/C | LIS - B |
| IP - NHS - B/C | LIS - C |
| IP - NHS - A | LIS - A |

ATM NETWORK TOPOLOGY MANAGEMENT METHOD

BACKGROUND OF THE PRESENT INVENTION

This invention relates to an Asynchronous Transfer Mode (referred to as ATM, hereinafter) network topology management method for an ATM network to which a plurality of ATM switches and a plurality of ATM terminals are connected. More particularly, the present invention relates to the ATM network topology management method that allows for detection to logical topology of the ATM network in either case that a network management system exists inside or outside of the ATM network. This method of the present invention can be easily integrated with a method for automatically detecting the equipment with no ATM interface such as routers or a terminals and the like, that is outside the ATM network.

A conventional ATM network topology management method physical connections of a plurality of ATM switches and a plurality of ATM terminals are automatically recognized that has been disclosed in, for example, JP-A-32597/1996, titled "ATM network topology management method".

The above conventional method is described hereinafter.

Each of the ATM switches and the ATM terminals transmits information on a network address of a network management agent for controlling those ATM switches and ATM terminals and port identifiers for identifying the respective ports to the adjacent ATM switch and the ATM terminal by every ATM port for the ATM switch and the ATM terminal using ILMI protocol. Those ports are directly connected to the adjacent ATM switches and ATM terminals.

Receiving the information, each of the ATM switch and the ATM terminal holds a table containing a network address of the network management agent that controls the adjacent ATM switch and adjacent ATM terminal directly connected to the respective ATM port and a port identifier representing the connected ports.

Accessing the above-derived data in the table sequentially can automatically recognize the physical connections of each of the ATM switches and ATM terminals.

Supposing that the ATM network is divided into a plurality of logical subnets, the conventional ATM network topology management method fails to automatically identify the ATM switches and the ATM terminals belonging to a certain logical subnet.

SUMMARY OF THE INVENTION

It is an object of the present invention to provide an ATM network topology management method to solve the above problems.

It is another object of the invention to provide a technology allowing for not only detection of the physical topology of the ATM network but also automatic detection of the logical topology.

It is still another object of the invention to provide the ATM network topology management method can be easily integrated with a method for automatically detecting the equipment with no ATM interface such as a router, terminal and the like that is outside the ATM network.

The above objects of the present invention is achieved by providing an ATM network topology management method for an ATM network to that a plurality of ATM switches and a plurality of ATM terminals are connected optionally, wherein an NBMA Next Hop Resolution Protocol (referred to as NHRP, hereinafter) is used for obtaining an ATM address from a network address in the ATM network, and a network management system is assumed to be directly connected to the ATM network, the ATM network topology management method comprising: a first step for reading a network address of an NHRP server that has been set in an NHRP client placed in the network management system; a second step for recognizing a topology of a logical subnet served by the NHRP server within the ATM network by accessing the NHRP server with a network address derived from the first step and obtaining information on a logical subnet served by the NHRP server and an ATM terminal and an ATM switch belonging to the logical subnet; and a third step in which the network management system reads information on other NHRP server within the ATM network from the NHRP server, obtains a network address of the other NHRP server, accesses the other NHRP server with an obtained network address and obtains information on other logical subnet served by the other NHRP server and an ATM terminal and an ATM switch belonging to the other logical subnet so that a topology of a logical subnet served by the other NHRP server is automatically recognized in the ATM network.

The objects of the present invention is achieved by providing An ATM network topology management method for an ATM network to that a plurality of ATM switches and a plurality of ATM terminals are connected optionally, wherein an NHRP protocol is used for obtaining an ATM address from a network address in the ATM network and a network management system is assumed not to be directly connected to the ATM network, the ATM network topology management method comprising: a first step in which said network management system reads a network address of an NHRP server that has been set in an NHRP client placed in a router connected to the ATM network; a second step for recognizing a topology of a logical subnet served by the NHRP server within the ATM network by accessing the NHRP server with a network address derived from the first step and obtaining information on a logical subnet served by said NHRP server and an ATM terminal and an ATM switch belonging to the logical subnet; and a third step in which the network management system reads information on other NHRP server within the ATM network from said NHRP server, obtains a network address of the other NHRP server, accesses the other NHRP server with an obtained network address and obtains information on other logical subnet served by the other NHRP server and ATM terminal and an ATM switch belonging to the other logical subnet so that a topology of a logical subnet served by the other NHRP server is automatically recognized in the ATM network.

Furthermore, it is preferable that above-described network management system, when the network management system detects a router connected to other ATM network, comprising a step for recognizing a topology of a logical subnet in the other ATM network by reading a network address of an NHRP server in the other ATM network that has been set in an NHRP client placed in the router, accessing an NHRP server in the other ATM network with an obtained network address and repeating the second step and the third step.

As described so far, the ATM network topology management method allows for not only detection of the physical topology of the ATM network but also automatic detection of the logical topology. The ATM network topology management method can be easily integrated with a method for automatically detecting the equipment with no ATM interface such as routers, terminals and the like that is outside the ATM network.

BRIEF DESCRIPTION OF THE DRAWINGS

This and other objects, features and advantages of the present invention will become more apparently upon a reading of the following detailed description and drawings, in which:

FIGS. 3A and 3B are figures showing an example of the nhrpAddrTable; and

FIGS. 4A and 4B are figures showing an example of the nhrpServerTable.

EMBODIMENT

Figure 1:
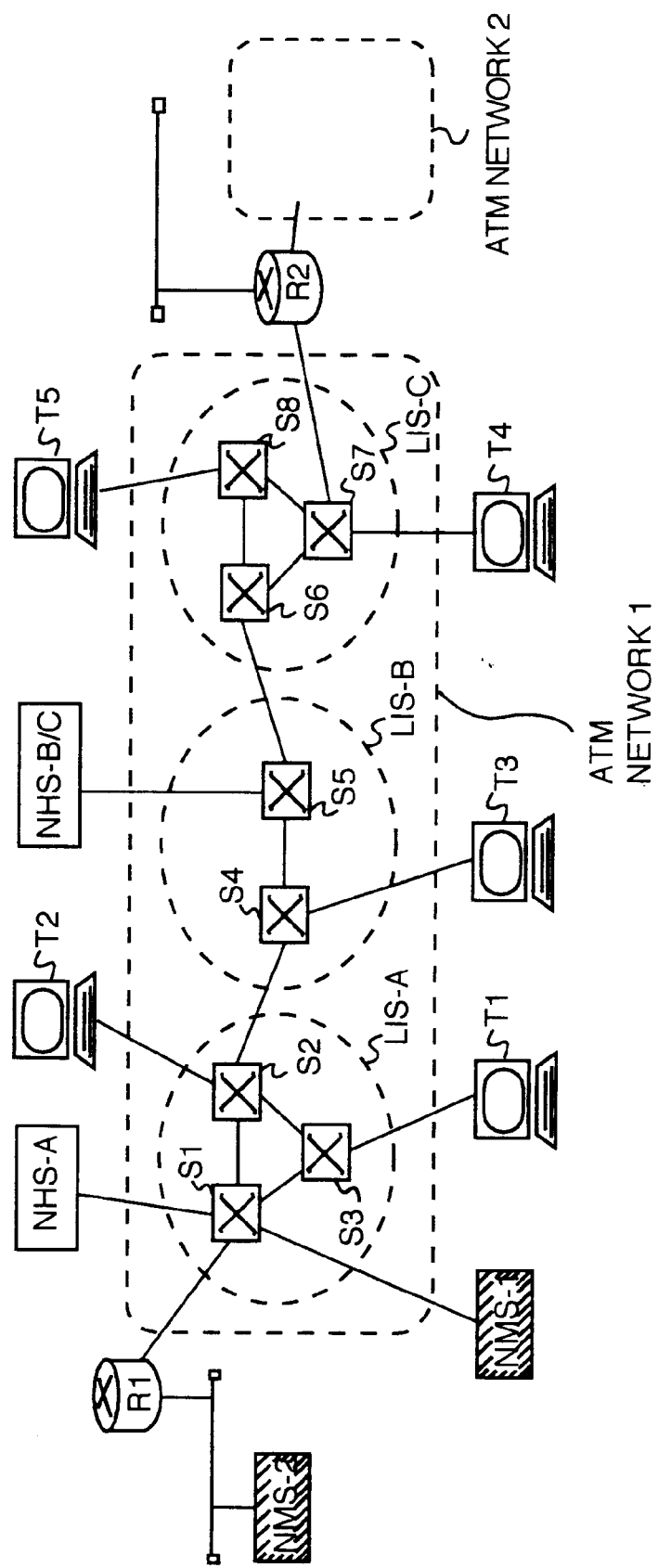
FIG. 1 illustrates an example of a network managed by the present invention.

An embodiment of the present invention is explained referring to the drawings.

FIG. 1 shows a network managed by the ATM network topology management method of the present invention.

It is assumed that in the present invention, a network management system (referred to as NMS, hereinafter) uses an SNMP protocol as a network management protocol, as well as uses an UDP/IP protocol as a low-order protocol thereof. It is also assumed that IP communication on the ATM network is executed by setting a corresponding PVC or setting an SVC obtained by acquiring an ATM address from the IP address of the communication partner using an NHRP protocol (this procedure is referred to as "resolving the address" or "address resolution", hereinafter). The NHRP protocol has been discussed by Internet Engineering Task Force (referred to as IETF, hereinafter) and its specification is described in a draft-ietf-rolc-NHRP-04.txt and the like(work in progress).

The present invention can use other protocols as far as they keep the principle thereof, for example, a CMIP protocol can replace the SNMP protocol as the network management protocol and IPX, Apple Talk and the like can replace the IP protocol.

Referring to FIG. 1, each of ATM switches S1 to S8 is connected to form an ATM network 1. Each of ATM terminals T1 to T5 is connected to the ATM network 1. A router R1 or R2 can be connected to the ATM network 1. Otherwise an existing network such as ethernet or another ATM network 2 can be connected to the ATM network 1.

The NMS can be directly connected to the ATM network 1 like an NMS-1. The NMS can be connected to the other network except the ATM network 1 via a router R1 like an NMS-2.

A plurality of logical IP Subnets (referred to as LIS, hereinafter), LIS-A, LIS-B and LIS-C, are defined on the ATM network 1.

At least one NHRP server (referred to as NHS, hereinafter) is provided with the ATM network 1. A single NHS can be provided for every LIS like the NHS-A or provided for a plurality of LIS(s) like the NHS-B/C.

The NHS-A holds each pair of the IP address and ATM address of the respective ATM terminals T1, T2, router R1, NMS-1 and ATM switches Si to S3 belonging to the LIS-A. Responding to the inquiry on the address resolution of any of the ATM terminals or ATM switches, the NHS-A sends back the corresponding ATM address. The NHS-B/C holds each pair of the IP address and ATM address of the respective ATM terminal T3 and ATM switches S4, S5 belonging to the LIS-B. The NHS-B/C concurrently holds each pair of the IP address and ATM address of the respective ATM terminals T4, T5, router R2 and ATM switches S6 to S8. Responding to the inquiry on the address resolution of any of the ATM terminals or ATM switches, the NHS-B/C sends back the corresponding ATM address just in the same way as the NHS-A. Such information is defined as nhrpAddrTable at every NHS in an NHRP Management Information Base (referred to as NHRP-MIB, hereinafter). FIG. 3 shows each example of the nhrpAddrTable of the NHS-A and NHS-B/C. As described later, the nhrpAddrTable is read by the NMS using the SNMP protocol in case of necessity.

In the present invention, as described above, a function of the NHS is set, NHS-A can be expressed by "serving the LIS-A" or "serving the ATM terminals and ATM switches belonging to the LIS-A". A function of the NHS-B/C likewise can be expressed by "serving the LIS-B and LIS-C" or "serving the ATM terminals and ATM switches belonging to the LIS-B or LIS-C".

When a plurality of NHS(s) are set on the ATM network, IP addresses of each and all the NHS(s) and information on the LIS(s) served by each and all the NHS(s) are stored in the respective NHS(s) including the one served by itself. Those information are defined as nhrpServerTable in NHRP-MIB. FIG. 4 shows each example of the nhrpServerTable of the NHS-A and NHS-B/C. The nhrpServerTable is read by the NMS using the SNMP protocol in case of necessity just in the same way as the nhrpAddrTable.

An NHRP client (referred to as NHC, hereinafter) is provided within each ATM terminal and the ATM switch, that sends an inquiry to the NHS serving the NHC at a time for the IP communication from each ATM terminal and the ATM switch so that the ATM address is derived from the IP address of the communication partner. Therefore each NHC stores an IP address of the NHS that serves the NHC. The NHC is not shown in FIG. 1.

Figure 2:
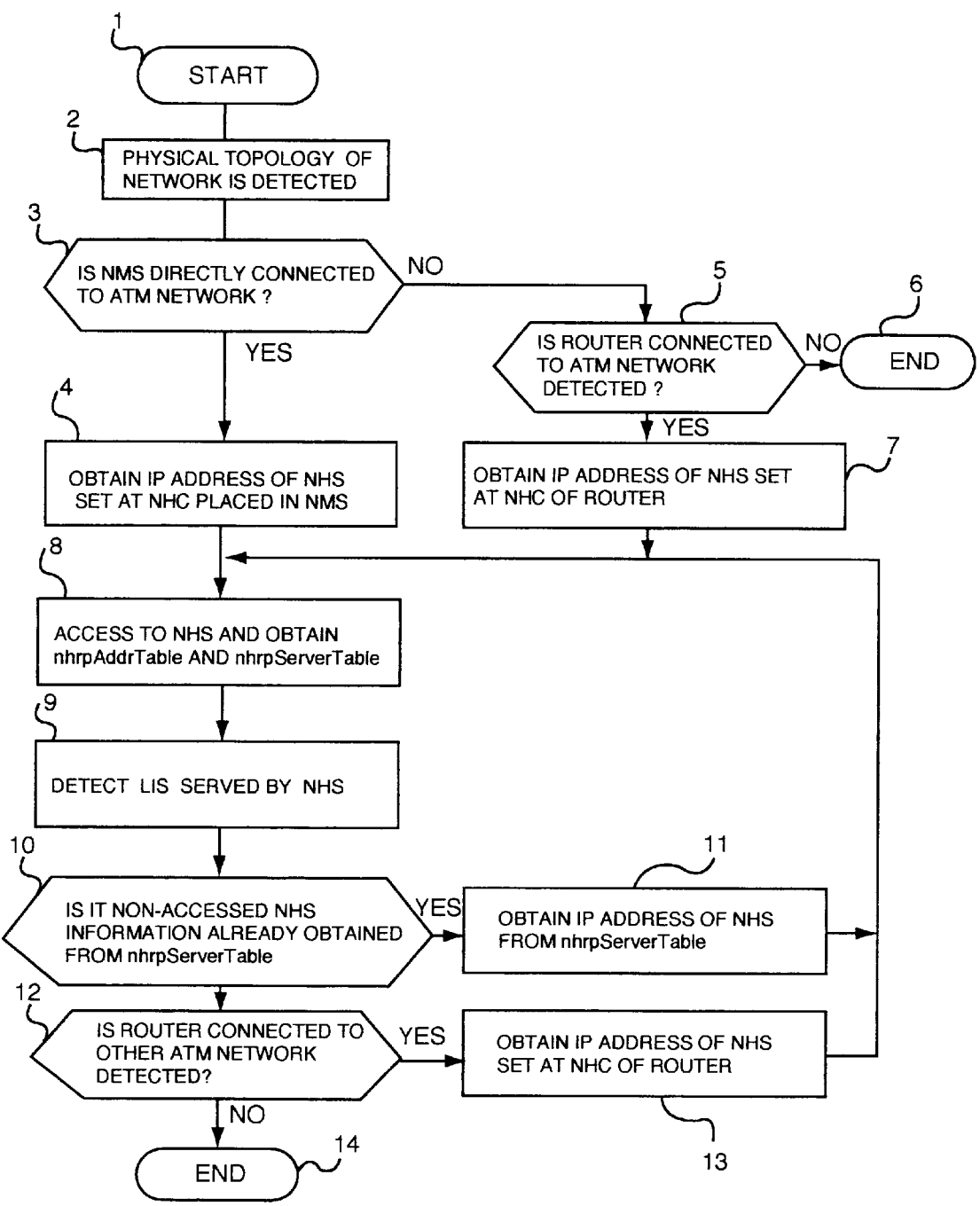
FIG. 2 is a flowchart of a series of processing of an embodiment of the present invention.

An operation of the present invention is described referring to a flowchart of FIG. 2. In FIG. 2, the NMS is started at step 1.

At step 2, a physical topology of the network is detected with a conventional method. This allows to recognize the physical topology of the network as a whole and the logical topology of the network except the ATM network.

At a step 3, it is judged whether or not the NMS is directly connected to the ATM network. When the NMS is directly connected to the ATM network (First embodiment), the process proceeds to step 4 where the NHC placed in the NMS is accessed to obtain the IP address of the NHS. When the NMS is not directly connected to the ATM network (second embodiment), the process proceeds to step 5 where it is judged whether a router connected to the ATM network is detected as a result of the step 2. When the router connected to the ATM network cannot be detected, the process proceeds to step 6 and the operation is terminated. When the router connected to the ATM network can be detected, the process proceeds to step 7 where the NHC placed in the router is accessed to obtain the IP address of the NHS.

Then at step 8, the IP address obtained at step 4 or step 7 is used for accessing the NHS using the SNMP protocol and obtains nhrpServerTable and nhrpAddrTable of the NHRP-MIB.

Proceeding to step 9, the LISs served by the NHS and the terminals, switches, routers and the like belonging to the LISs are detected from information contained in the nhrpServerTable and nhrpAddrTable.

Then at step 10, it is judged whether the nhrpServerTable contains any NHS information that has not been accessed yet. When there are non-accessed NHSs, the process proceeds to step 11 where the IP address of the non-accessed NHS is obtained from the nhrpServerTable and returns to step 8 for repeating the subsequent processes. At step 10 executed for the second time or after, both the nhrpServerTables already obtained and newly obtained are subjected to judgement.

At step 10, in case of no non-accessed NHS, the process proceeds to step 12 where it is judged whether the router connected to the other ATM network has been detected as a result of step 9. When the router connected to the other ATM network has not been detected, the process proceeds to step 14 and the operation is terminated. When the router connected to the other ATM network has been detected, the process proceeds to step 13 where the IP address of the NHS is obtained by accessing the NHC placed in the router. The process returns to step 8 for repeatedly proceeding the subsequent operations.

Next the operation of each embodiment is described referring to FIG. 1 to FIG. 4.

The operation of the first embodiment is described.

Referring to FIG. 1, it is assumed that the NMS-1 is directly connected to the ATM network 1. A conventional method is used for detecting a physical topology (FIG. 2: step 2). As for the network except the ATM network, the LIS is always distinguished by a router. Therefore recognizing the physical topology may allow for recognition of the logical topology. A method for detecting the logical topology of only the ATM network is described hereinafter.

The NMS-1 is directly connected to the ATM network 1 (FIG. 2 : step 3) and executes address resolution using the NHRP protocol. The NMS-1 has an NHC placed therein. So the NMS-1 accesses the NHC to obtain an IP address IP-NHS-A of the NHS that has been set in the NHC (FIG. 2: step 4).

The NMS-1 uses the obtained IP address to access to the NHS-A using the SNMP protocol and obtains the nhrpServerTable of the NHRP-MIB (FIG. 2: step 8). This information is referenced for recognizing as to that LIS is served by the NHS-A (FIG. 2: step 9). As FIG. 4A shows, the NHS-A serves the LIS-A. Therefore it is recognized that LIS-A exists in the ATM network. The NMS-1 also obtains the nhrpAddrTable of the NHRP-MIB so as to recognize as to which ATM terminals and ATM switches are registered with the NHS-A. As FIG. 3A shows, it is recognized that the ATM terminal T1, T2, a router R1, NMS-1 and ATM switches S1 to S3 belong to the LIS-A.

Next the NMS-1 obtains an IP address of the other NHS except the NHS-A (FIG. 2: step 10 and step 11) from the nhrpServerTable obtained from NHS-A. From FIG. 4A, the NMS-1 obtains IP-NHS-B/C as the IP address of the NHS-B/C from the nhrpServerTable.

The NMS-1 detects the logical topology of the ATM network 1 based on the IP address "IP-NHS-B/C" as described above (FIG. 2: step 8 and step 9).

That is the NMS-1 accesses the NHS-B/C based on the IP address using the SNMP protocol and obtains the nhrpServerTable of the NHRP-MIB. From this information, it is recognized as to which LIS is served by the NHS-B/C. FIG. 4B shows that the NHS-B/C serves the LIS-B and LIS-C. Therefore it is recognized that the LIS-B and LIS-C exist in the ATM network. The NMS-1 obtains the nhrpAddrTable of the NHRP-MIB so that the ATM terminals and ATM switches belonging to the LIS-B/C can be recognized. FIG. 3B shows that the ATM terminal T3, ATM switches S4 and S5 belong to the LIS-B and the ATM terminals T4 and T5, a router R2 and the ATM switches S6 to S8 belong to the LIS-C.

When the NHS except the NHS-A and NHS-B/C exists within the ATM network 1, repetition of the above-described processes contributes to detection of whole logical topology of the ATM network 1.

When the NMS-1 detects a router R2 connected to an ATM network 2 except the ATM network 1 (FIG. 2: judgement step 12), the following processing is executed.

Since the router R2 is directly connected to the ATM network 2, the address resolution is executed using the NHRP protocol. This shows that the router R2 has an NHC placed therein. Then the NMS-1 accesses the NHC in the router R2 and obtains an IP address of the NHS on the ATM network 2 that has been set in the NHC (FIG. 2: step 13). The logical topology of the ATM network 2 can be detected in the same manner as described above (FIG. 2: step 8 to step 11).

The ATM network topology management method of the present invention can be integrated with a conventional ATM network topology management method in the above described manner.

Next an example of the operation of the second embodiment is described.

It is assumed that in FIG. 1, an NMS-2 is not directly connected to the ATM network 1 (FIG. 2: judgement step 3). First a conventional method is used to detect the physical topology. As for the network except the ATM network, the LIS is always distinguished by a router. Therefore recognizing the physical topology may allow for recognition of the logical topology. A method for detecting the logical topology of the ATM network is described hereinafter.

It is assumed that the NMS-2 detects the router R1 connected to the ATM network 1 (FIG. 2: judgment step 5).

Since the router R1 is connected to the ATM network 1, the address resolution is executed using the NHRP protocol. This shows that the router R1 has an NHC placed therein. Then the NMS-2 accesses the NHC of the router R1 and obtains an IP address of the NHS on the ATM network 1 that has been set in the NHC (FIG. 2: step 7).

The processing identical to the description of the first embodiment (FIG. 2: step 8 to step 14) leads to detection of the logical topologys of both the ATM network 1 and the ATM network 2.

What is claimed is:

1. An Asynchronous Transfer Mode (referred to as ATM, hereinafter) network topology management method for an ATM network so that a plurality of ATM switches and a plurality of ATM terminals are connected optionally, wherein:

an NBMA Next Hop Resolution Protocol (referred to as NHRP, hereinafter) is used for obtaining an ATM address from a network address in said ATM network, and a network management system is directly connected to said ATM network, said ATM network topology management method comprising:

a first step for reading a network address of an NHRP server that has been set in an NHRP client placed in said network management system;

a second step for recognizing a topology of a logical subnet served by said NHRP server within said ATM network by accessing said NHRP server with a network address derived from said first step and obtaining information on a logical subnet served by said NHRP server and an ATM terminal and an ATM switch belonging to said logical subnet; and a third step in which said network management system reads information on other NHRP server within said ATM network from said NHRP server, obtains a network address of said other NHRP server, accesses said other NHRP server with an obtained network address and obtains information on other logical subnet served by said other NHRP server and an ATM terminal and an ATM switch belonging to said other logical subnet so that a topology of a logical subnet served by said other NHRP server is automatically recognized in said ATM network.

2. The ATM network topology management method of claim 1, when said network management system detects a router connected to other ATM network, comprising a step for recognizing a topology of a logical subnet in said other ATM network by reading a network address of an NHRP server on said other ATM network that has been set in an NHRP client placed on said router, accessing said NHRP server in said other ATM network with an obtained network address and repeating said second step and said third step.

3. The ATM network topology management method of claim 1, wherein said network management system employs an SNMP protocol as a network management protocol.

4. The ATM network topology management method of claim 1, wherein UDP/IP is used as a low-order protocol of SNMP protocol.

5. The ATM network topology management method of claim 1, wherein said NHRP server stores an IP address either of an ATM terminal, ATM switch or a router served by said NHRP server and an ATM address either of said ATM terminal, ATM switch or router in pairs.

6. The ATM network topology management method of claim 1, wherein said NHRP server stores information on its own IP address and a subnet served by said NHRP server and information on an IP address of other NHRP server set in said ATM network and a subnet served by said other NHRP server.

7. The ATM network topology management method of claim 1, wherein said network management system employs a CMIP protocol as a network management protocol.

8. The ATM network topology management method of claim 1, wherein IPX is used as a network layer protocol.

9. The ATM network topology management method of claim 1, wherein AppleTalk is used as a network layer protocol.

10. An ATM network topology management method for an ATM network so that a plurality of ATM switches and a plurality of ATM terminals are connected optionally, wherein:
   an NHRP protocol is used for obtaining an ATM address from a network address in said ATM network, and
   a network management system is not directly connected to said ATM network,
   said ATM network topology management method comprising:
      a first step in which said network management system reads a network address of an NHRP server that has been set in an NHRP client placed in a router connected to said ATM network;
      a second step for recognizing a topology of a logical subnet served by said NHRP server within said ATM network by accessing said NHRP server with a network address derived from said first step and obtaining information on a logical subnet served by said NHRP server and an ATM terminal and an ATM switch belonging to said logical subnet; and
      a third step in which said network management system reads information on other NHRP server within said ATM network from said NHRP server, obtains a network address of said other NHRP server, accesses said other NHRP server with an obtained network address and obtains information on other logical subnet served by said other NHRP server and an ATM terminal and an ATM switch belonging to said other logical subnet so that a topology of a logical subnet served by said other NHRP server is automatically recognized in said ATM network.

11. The ATM network topology management method of claim 10, when said network management system detects a router connected to other ATM network, comprising a step for recognizing a topology of a logical subnet in said other ATM network by reading a network address of an NHRP server in said other ATM network that has been set in an NHRP client placed in said router, accessing an NHRP server in said other ATM network with an obtained network address and repeating said second step and said third step.

12. The ATM network topology management method of claim 10, wherein said network management system employs an SNMP protocol as a network management protocol.

13. The ATM network topology management method of claim 10, wherein UDP/IP is used as a low-order protocol of SNMP protocol.

14. The ATM network topology management method of claim 10, wherein said NHRP server stores an IP address either of an ATM terminal, ATM switch or a router served by said NHRP server and an ATM address of said ATM terminal, ATM switch or router in pairs.

15. The ATM network topology management method of claim 10, wherein said NHRP server stores information on its own IP address and a subnet served by said NHRP server and information on an IP address of other NHRP server set in said ATM network and a subnet served by said other NHRP server.

16. The ATM network topology management method of claim 10, wherein said network management system employs a CMIP protocol as a network management protocol.

17. The ATM network topology management method of claim 10, wherein IPX is used as a network layer protocol.

18. The ATM network topology management method of claim 10, wherein AppleTalk is used as a network layer protocol.

19. An ATM network topology management method for an ATM network so that a plurality of ATM switches and a plurality of ATM terminals are connected optionally, wherein:
   an NHRP is used for obtaining an ATM address from a network address in said ATM network comprising:
      a first step, when said network management system is directly connected to said ATM network, for reading a network address of an NHRP server that has been set in an NHRP client placed in a network management system;
      a second step, when said network management system is not directly connected to said ATM network, in which said network management system reads a network address of an NHRP server that has been set in an NHRP client placed in a router connected to said ATM network;
      a third step for recognizing a topology of a logical subnet served by said NHRP server within said ATM network by accessing said NHRP server with a network address derived from said first step or said second step and obtaining information on a logical subnet served by said NHRP server and an ATM terminal and an ATM switch belonging to said logical subnet; and a fourth step in which said network management system reads information on other NHRP server within said ATM network from said NHRP server, obtains a network address of said other NHRP server, accesses said other NHRP server with an obtained network address and obtains information on other logical subnet served by said other NHRP server and an ATM terminal and an ATM switch belonging to said other logical subnet so that a topology of a logical subnet served by said other NHRP server is automatically recognized in said ATM network.

20. The ATM network topology management method of claim 19, when said network management system detects a router connected to other ATM network, comprising a step for recognizing a topology of a logical subnet in said other ATM network by reading a network address of an NHRP server in said other ATM network that has been set in an NHRP client placed in said router, accessing an NHRP server on said other ATM network with an obtained network address and repeating said third step and said fourth step.

21. The ATM network topology management method of claim 19, wherein said network management system employs an SNMP protocol as a network management protocol.

22. The ATM network topology management method of claim 19, wherein said network management system employs a CMIP protocol as a network management protocol.

23. The ATM network topology management method of claim 19, wherein UDP/IP is used as a low-order protocol of SNMP protocol.

24. The ATM network topology management method of claim 19, wherein IPX is used as a network layer protocol.

25. The ATM network topology management method of claim 19, wherein AppleTalk is used as a network layer protocol.

26. The ATM network topology management method of claim 19, wherein said NHRP server stores an IP address either of an ATM terminal, ATM switch or a router served by said NHRP server and an ATM address of either said ATM terminal, ATM switch or router in pairs.

27. The ATM network topology management method of claim 19, wherein said NHRP server stores information on its own IP address and a subnet served by said NHRP server and information on IP address of other NHRP server set in said ATM network and a subnet served by said other NHRP server.

* * * * *